Feb. 21, 1928.  
R. B. FAGEOL  
ROAD VEHICLE  
Filed Nov. 2, 1921

WITNESS  
H. Sherburne

INVENTOR  
ROLLIE B. FAGEOL.  
BY  
White Prost & Evans  
his ATTORNEYS

Feb. 21, 1928.  1,660,188
R. B. FAGEOL
ROAD VEHICLE
Filed Nov. 2, 1921  7 Sheets-Sheet 6
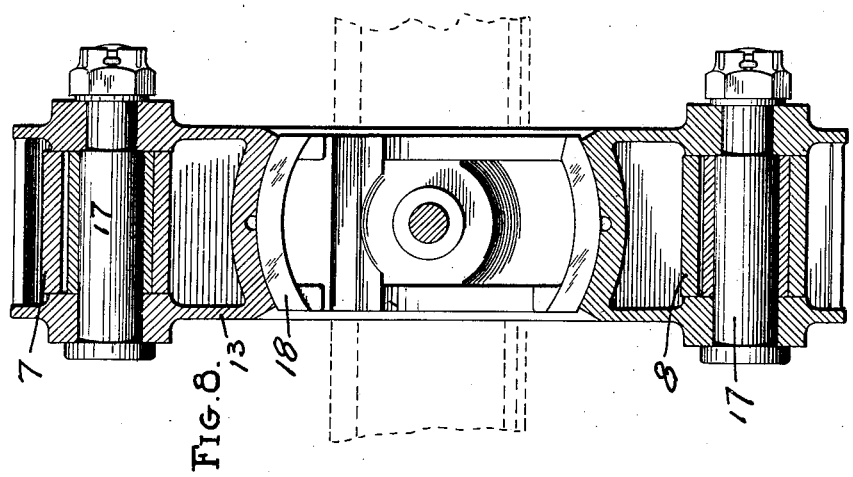
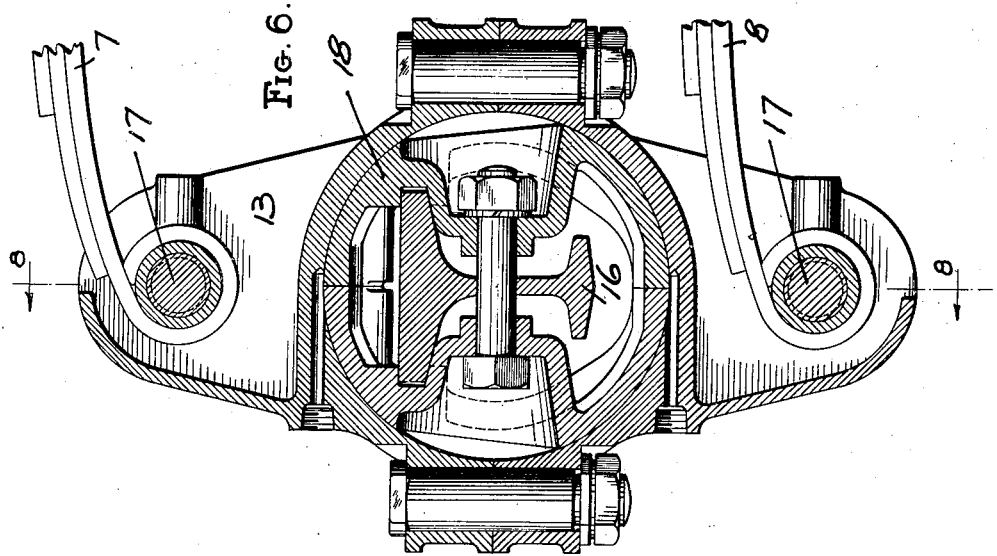
WITNESS
H. Sherburne
INVENTOR
ROLLIE B. FAGEOL.
BY
White Prost Evans
his ATTORNEYS Feb. 21, 1928.
R. B. FAGEOL
1,660,188
ROAD VEHICLE
Filed Nov. 2, 1921
7 Sheets-Sheet 7
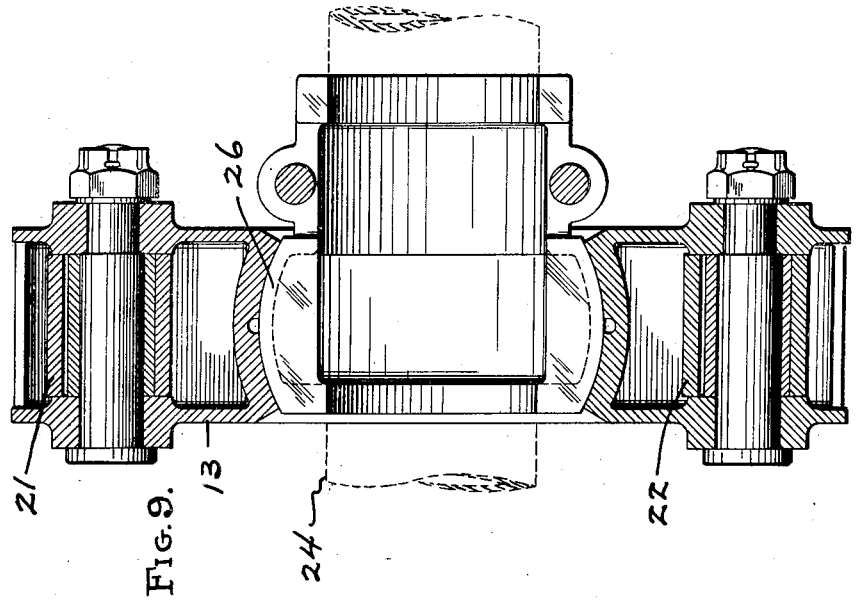
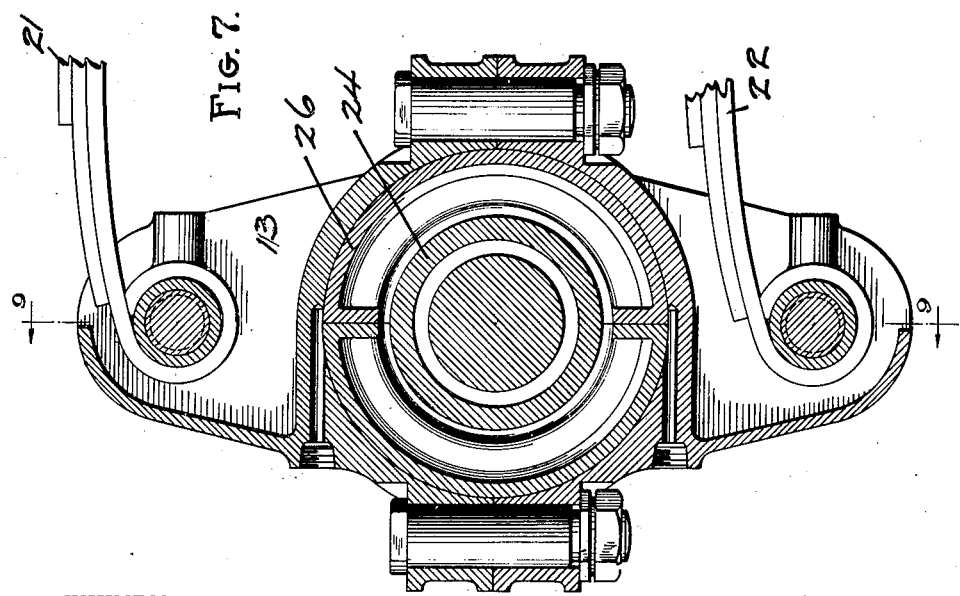
WITNESS
H. Sherburne
INVENTOR
ROLLIE B. FAGEOL
BY
White Prost & Evans
his ATTORNEYS Patented Feb. 21, 1928.

1,660,188

UNITED STATES PATENT OFFICE.

ROLLIE B. FAGEOL, OF OAKLAND, CALIFORNIA.

ROAD VEHICLE.

Application filed November 2, 1921. Serial No. 512,243.

The invention relates to road vehicles of the power propelled type, such as trucks or omnibuses, and of the drawn type, such as trailers, and relates particularly to vehicles having more than four ground engaging wheels in which four of the said wheels are arranged in a unit assembly or truck. In the preferred form of my invention I employ two four-wheel trucks, one arranged at the front of the vehicle and the other at the rear, although it is to be understood that it is not essential that two four-wheel trucks be used in the vehicle. The present invention relates particularly to the construction for resisting the torque reactions independently of the springs without substantially interfering with the free movement of the axles requiring for a proper functioning of the springs, other features of the vehicle being disclosed and claimed in my copending application Serial No. 470,627 filed in the Patent Office on May 18, 1921, and in my application Serial No. 36,543, filed June 11, 1925.

An object of the present invention is to provide a four-wheel truck construction that permits the vehicle to travel over roads of uneven surface without subjecting the truck or the vehicle to deleterious strains.

A further object of the invention is to provide a four-wheel truck in which the axles are free to assume varying angular positions due to irregularities in the road, without subjecting the vehicle supporting springs to twisting.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one specific form of my invention, but it is to be understood that I do not limit myself to such form, since the invention, as expressed in the claims, may be embodied in other forms.

Referring to said drawings:

Fig. 6 is a vertical section taken through a front axle, showing the spring hanger.

Fig. 7 is a vertical section taken through a rear axle, showing the spring hanger.

Fig. 8 is a vertical section taken on the line 8—8, Fig. 6.

Fig. 9 is a vertical section taken on the line 9—9, Fig. 7.

Figure 1:
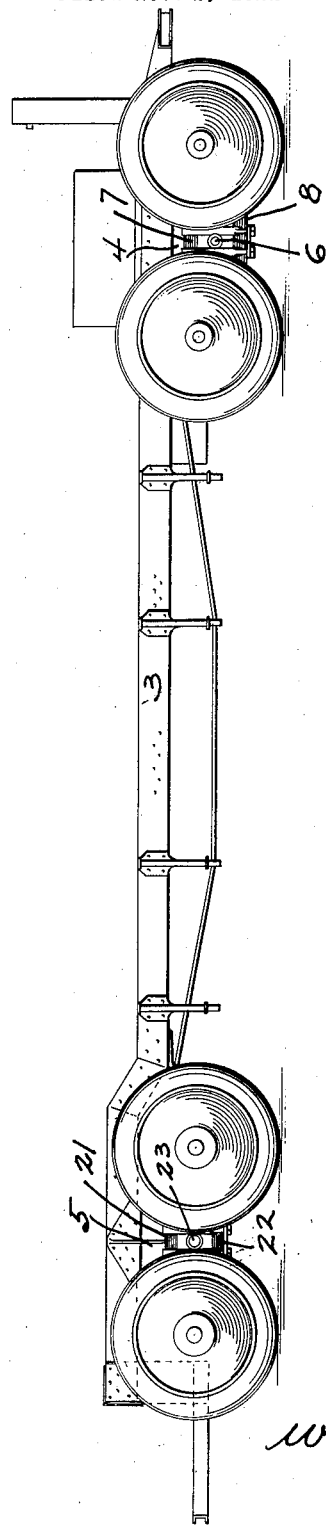
Figure 1 is a side elevation of the chassis of an eight wheeled vehicle embodying my invention.
Figure 2:
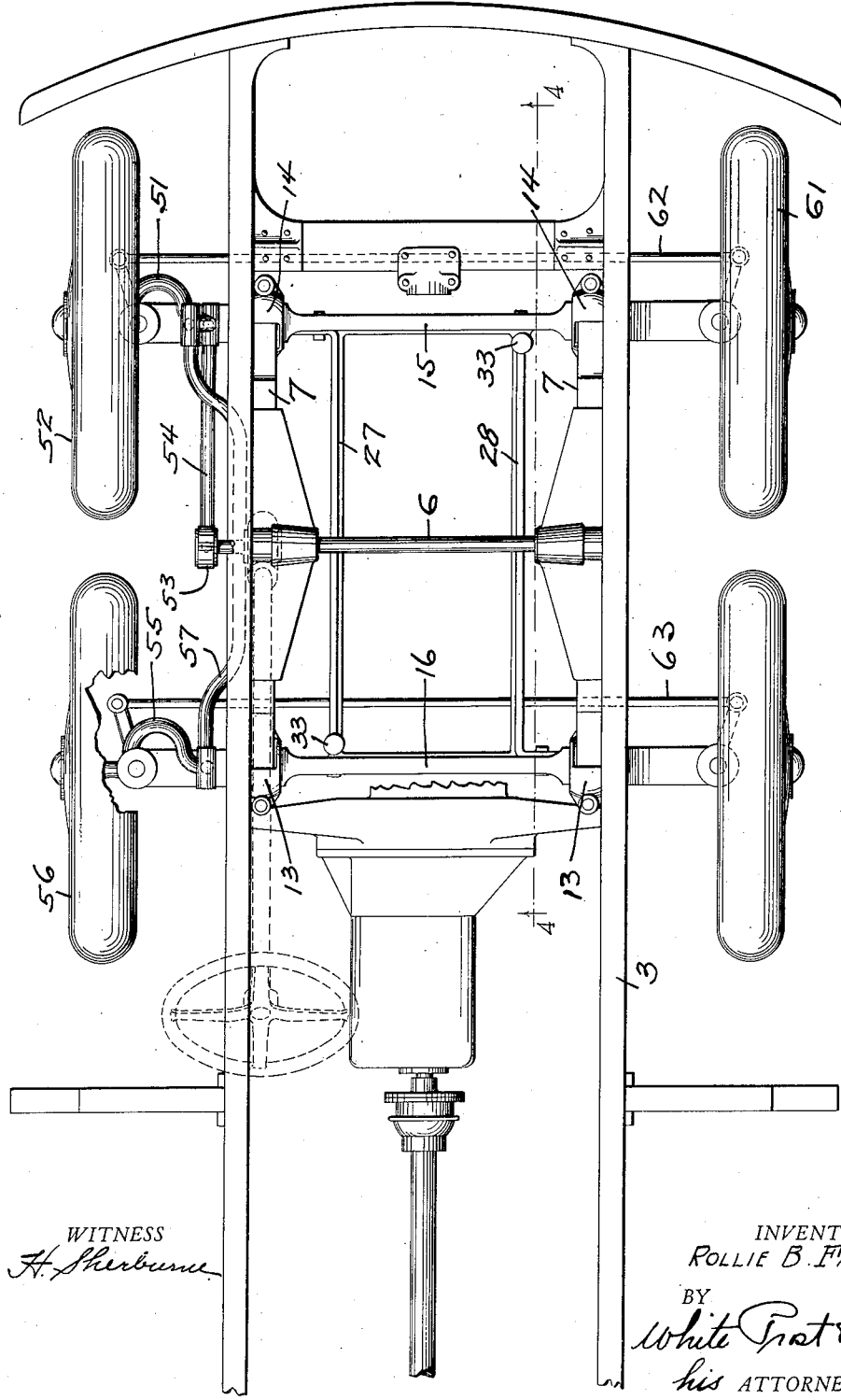
Fig. 2 is a top or plan view of the front truck.
Figure 3:
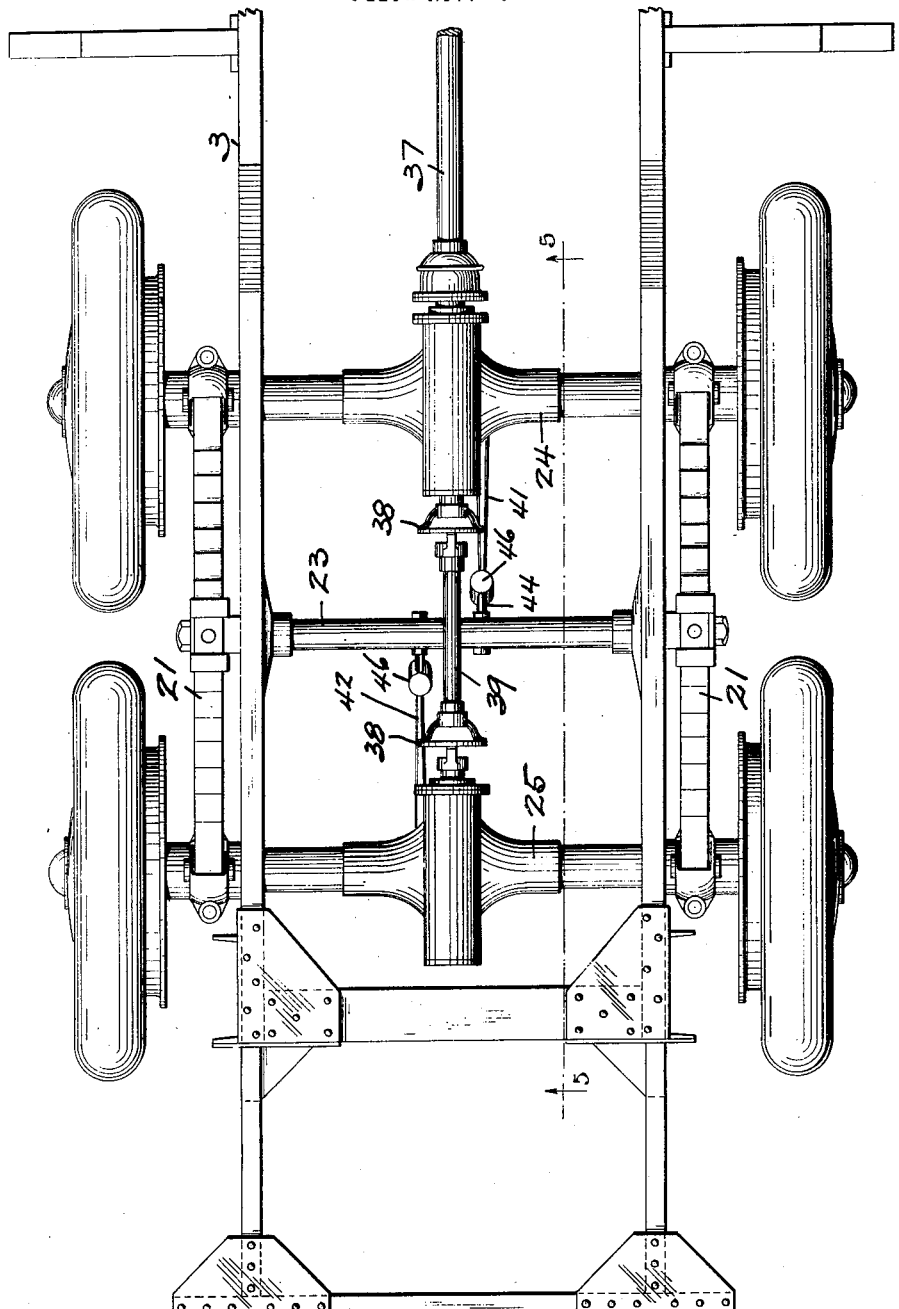
Fig. 3 is a top or plan view of the rear truck.
Figure 4:
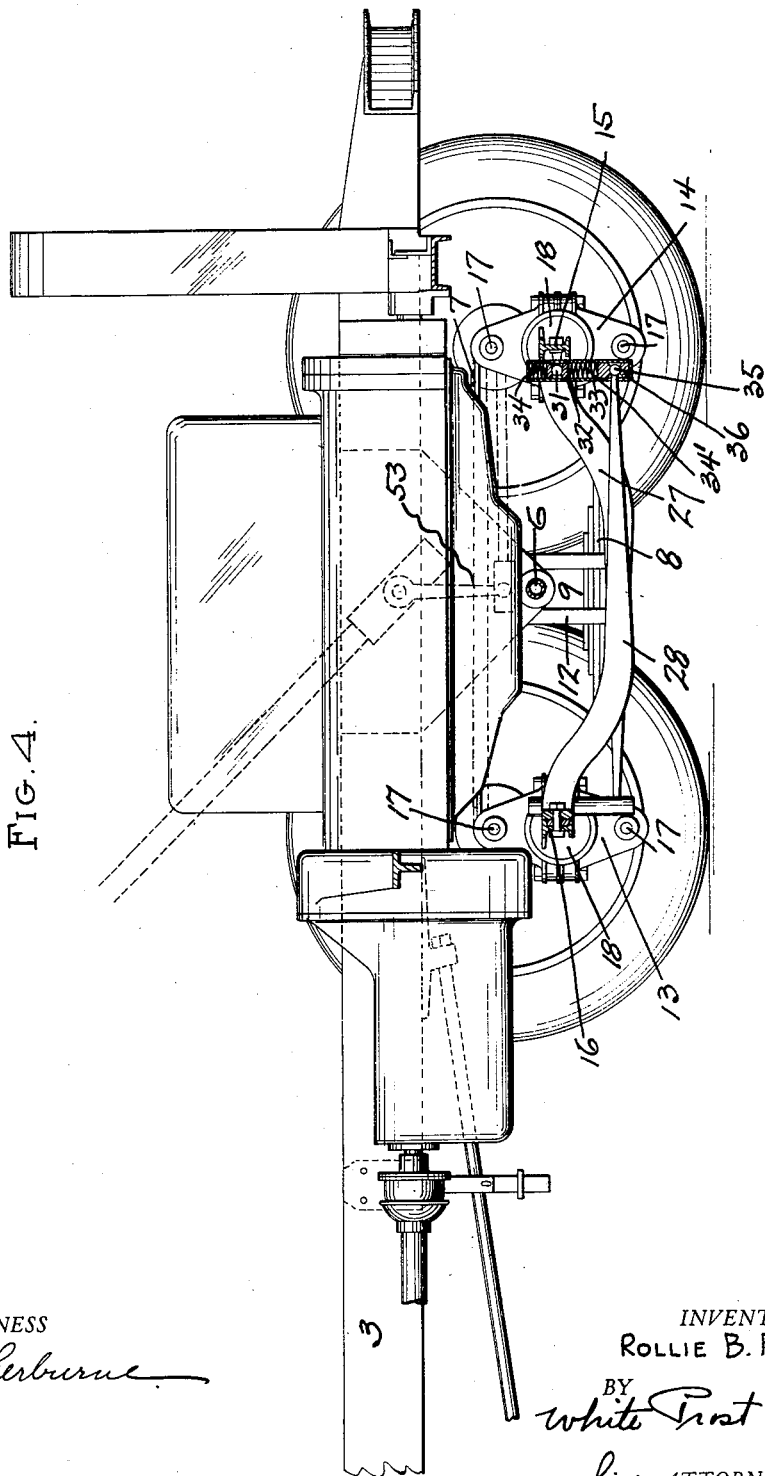
Fig. 4 is a vertical section through the front truck taken on the line 4—4, Fig. 2.
Figure 5:
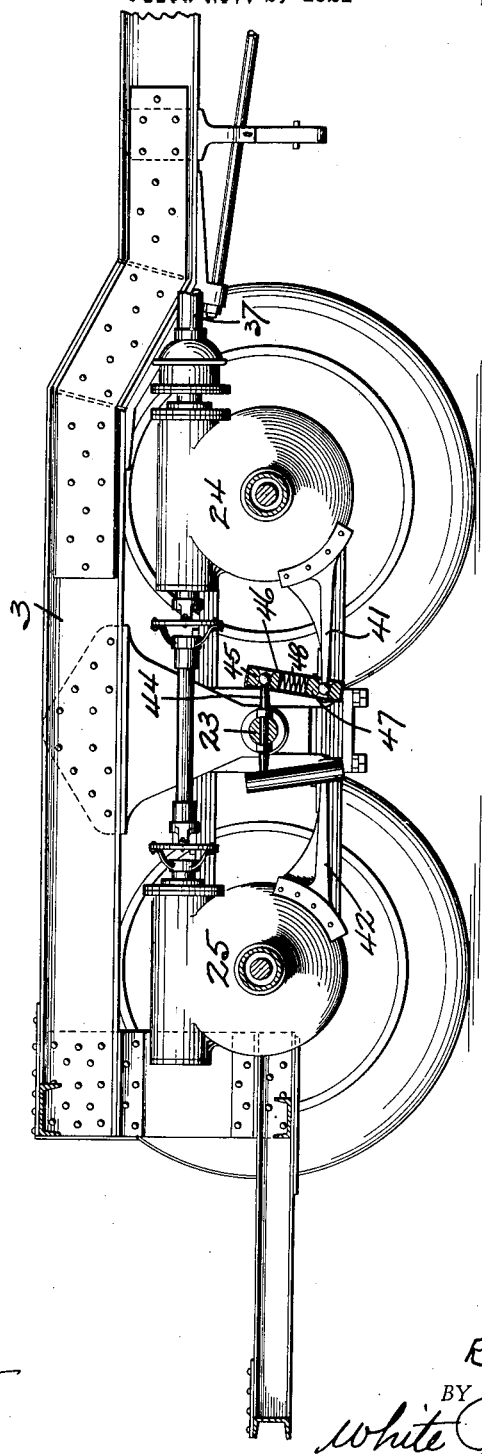
Fig. 5 is a vertical section through the rear truck taken on the line 5—5, Fig. 3.

The road vehicle of my invention, is shown in the drawings as being provided with eight wheels, assembled in groups of fours, forming two trucks, one being a steering truck and the other a driving truck, but it is to be understood that the invention is not limited to the particular vehicle shown, but may be embodied in a vehicle having one four wheel truck, which may be the steering truck or the driving truck.

The vehicle comprises a suitable main frame 3 upon which is mounted the driving motor and the body. The frame is supported at the front end on the front-truck 4 and at the rear end on the rear truck 5. Secured to and positioned below the frame at the forward end, is a transverse shaft 6, on which the spring assembly is rotatably mounted. The truck is provided on each side with two longitudinally disposed superposed leaf springs 7 and 8 and the springs on each side are clamped together at their centers to form a spring assembly. The two superposed springs 7 and 8 are spaced apart by a block 9 journalled on the shaft 6 and are secured together by clamps 12. At their ends the springs are provided with eyes adapted to receive the bolts 17, whereby they are secured to the spring hangers 13 and 14 respectively, the spring hangers being mounted on the axles 15 and 16 of the front truck.

As the wheels of the truck move over an uneven road or surface, the axles move in the vertical plane with respect to each other and with respect to the vehicle frame, and assume different relative angular positions in the vertical planes. This produces a relative angular movement of the axles with respect to the ends of the springs, tending to twist the spring leaves. To overcome this tendency I provide a flexible mounting for the spring hangers on the axles, so that relative angular movement of the axle and the frame will not twist the end of the spring. Secured to each axle, at each side thereof, is a ball or bearing member 18, having a spherical surface which is engaged by a complementary face on the spring hanger, so that the hanger is free to oscillate laterally with respect to the shaft. The ball 18 is preferably formed in two parts and bolted to the axle and the ball and the hanger are cut off at the sides, so that the bearing surfaces are in the shape of spherical zones.

On the rear truck 5, the springs 21 and 22 are similarly secured together as a unit, which is journalled on the transverse shaft 23. The ends of the springs are attached to the axles in a manner similar to that described in connection with the front truck, the main difference being that since the rear axles 24 and 25 are drive axles, they are somewhat differently shaped than the front axles and consequently the construction of the balls or spherical zone surface bearing elements 26 which are secured to the rear axles and on which the spring hangers are mounted, are of slightly different shapes on their inner surfaces.

The spring hangers are free to rock laterally through a limited angle with respect to the axles on which they are mounted and are also free to oscillate through a limited angle in the vertical longitudinal plane to permit the ends of the axles to lie in different planes spaced apart vertically.

Means are provided however, for holding the axles substantially fixed against rotation, but to permit a limited oscillation of small magnitude. Rotation of a front axle will change the angle of the steering knuckle pin with respect to the horizontal and thus interfere with steering the vehicle. The front axles are held substantially against rotation by rods connecting the two axles in such manner as to permit independent angular movement of each axle and to permit the distances between the axles to vary with different spring flexure. Secured to the front axle 15, at one side of the vehicle is a substantially rigid rod 27 which is flexibly connected at its other end to the same side of the rear axle 16 and secured to the other side of the rear axle is a substantially rigid rod 28 which is flexibly connected at its other end to the same side of the front axle 15. The rod 27 prevents any appreciable rotation of the front axle 15 and the rod 28 prevents any appreciable rotation of the rear axle 16, and the flexible connections permit the axles to move vertically with respect to each other and permit the distances between the axles to vary. The amount of permissible rotation of the axle is determined by the small compressive movement of the springs 34—34' disposed in the tube 33. The flexible connection comprises a ball 31, secured to the axle and seating in a sliding bearing 32 carried in the tube 33. Springs 34 and 34' are disposed on opposite sides of the bearing to cushion the movement of the tube with respect to the bearing and to normally hold the tube in neutral position. The end of the rod is provided with a ball 35 which seats in a fixed bearing 36 in the tube, the two balls being spaced vertically so that differences in the spread of the axles cause the tube to rock. The swing of the tube is limited to the variation in spread of the axle due to spring flexure.

The driving axles 24 and 25 of the rear truck are also connected together or to a common member, so that their rotation is limited to a small angle and so that the distance between them may vary and so that they may freely assume different positions with regard to the horizontal plane. The drive shafts of the rear axles are connected to a propeller shaft 37 extending through the front axle 24 and into the rear axle 25, the portion of the shaft intermediate the axles being provided with universal joints 38 and a slip joint 39 to accommodate the relative movement of the axles.

Secured to the front drive axle 24, adjacent the center line of the vehicle, is an arm 41, which is flexibly connected to the cross shaft 23 in the same manner as the rods 27 and 28 are flexibly connected to their associated axles. A similar arm 42 is rigidly secured in a similar position to the rear drive axle 25 and is similarly connected to the cross shaft 23. The flexible connection comprises a rod 44, secured to the cross shaft 23, provided on its end with a ball, seated in a bearing 45 contained in the tube 46. The arm 41 is provided on its end with a ball seated in a sliding bearing 47 contained in the tube 46, the two bearings being held apart by the spring 48. The axles 24 and 25 are thus prevented from rotating except through a very limited angle but may spread apart or assume varying angular relations in the vertical plane. Other means may be employed for accomplishing the same result and it is to be understood that I do not limit myself to the specific means shown herein.

The four wheels of the front truck are steerable and the four driving wheels of the rear truck are non-steerable, but they are disposed sufficiently close together, so that there is practically no drag on the wheels as the vehicle makes a turn. The front wheels are interconnected so that all four wheels turn at the same time, the steering mechanism being constructed so that the front steering wheels turn through a greater angle than the rear steering wheels. The axle spindle arm 51 of the front steering wheel 52 is connected to the steering crank 53 by the drag link 54 and the axle spindle arm 55 of the rear steering wheel 56, on the same side of the vehicle, is connected to the arm 51 by the drag link 57. The point of connection of the drag link 57 with the arm 51 is spaced a lesser distance from the steering knuckle pivot of the wheel 52 than the point of connection of the drag link 57 with the arm 55 from the steering knuckle pivot of the wheel 56, so that the effective steering lever arm of the front wheel 52 is less than the effective steering lever arm of the rear wheel 56. This causes the front steering wheel to be deflected through a greater angle than the rear steering wheel, thus eliminating any drag of the steering wheels when the vehicle is turned. The front steering wheel 61 on the other side of the vehicle is connected to the front steering wheel 52 by the drag link 62 and the rear steering wheels are similarly connected by the drag link 63.

The four steering wheels are shown in the drawings as being perpendicular, but in practice they are inclined from the vertical, as is customary practice, to provide ease of steering. In practice the knuckle pins of the steering wheels are provided with the usual rake and the wheels toe in as is customary.

A further advantage of the vehicle of my invention is noticeable in rounding turns. Due to the short stiff springs employed in the construction of the vehicle, there is very little side sway or roll of the body when a turn is made, greatly adding to the comfort of the passengers, when the vehicle comprises an omnibus or stage. The majority of four wheel stages are equipped with air springs and the roll produced in the body on rounding a turn is very objectionable. Also the use of eight wheels greatly minimizes the danger when a tire blows out, since the other wheels will properly support the vehicle, and enable the vehicle to be properly steered.

I claim:

1. A road vehicle including tandem axles, each axle being supported by a pair of wheels, a frame, springs resiliently connecting said axles and frame, the axles being connected to said frame and to each other so that each axle is free to swing bodily independently of the other axle in the path of movement of the spring at the point of connection between the spring and said axle, and torque resisting means designed to resist the torque tending to rotate said axles about their axes, said means being yieldable in directions to permit the axles to swing bodily and to tilt and being substantially rigid in substantially vertical planes to resist the torque independently of said springs.

2. A road vehicle including tandem axles, each axle being supported by a pair of wheels, a frame, springs resiliently connecting said axles and frame, the axles being connected to said frame and to each other so that each axle is free to swing bodily independently of the other axle on the arc described by the spring at the point of its connection with said axle, and torque resisting connections extending between said axles, said connections being yieldable in directions to permit the axles to swing bodily and to tilt and being substantially rigid in substantially vertical planes to resist the torque independently of said springs.

3. A road vehicle including tandem axles, each axle being supported by a pair of wheels, a frame, springs supporting said frame from said axles, said springs causing upon deflection movement of one axle toward and from the other, torque resisting connections between said axles, each connection comprising an arm rigidly secured to one axle and connected to said other axle by a link normally substantially at right angles to said arm and secured to said arm and said other axle by joints that permit sidewise movement of the link.

In testimony whereof, I have hereunto set my hand.

ROLLIE B. FAGEOL.